United States Patent
Ito (10) Patent No.: US 9,205,756 B2
(45) Date of Patent: Dec. 8, 2015

(54) BATTERY SYSTEM

(71) Applicant: DENSO CORPORATION, Kariya, Aichi-pref. (JP)

(72) Inventor: Akira Ito, Nukata-gun (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 193 days.

(21) Appl. No.: 14/134,535

(22) Filed: Dec. 19, 2013

(65) Prior Publication Data

US 2014/0176079 A1 Jun. 26, 2014

(30) Foreign Application Priority Data

Dec. 25, 2012 (JP) ................................. 2012-281310

(51) Int. Cl.
*H02J 7/00* (2006.01)
*H02J 7/06* (2006.01)
(Continued)

(52) U.S. Cl.
CPC ........... *B60L 11/1866* (2013.01); *B60L 3/0046* (2013.01); *B60L 11/1859* (2013.01); *B60L 11/1861* (2013.01); *B60L 2210/10* (2013.01); *B60L 2210/30* (2013.01); *B60L 2230/16* (2013.01); *B60L 2240/545* (2013.01); *B60L 2240/547* (2013.01); *B60L 2240/549* (2013.01); *Y02T 10/7005* (2013.01); *Y02T 10/7044* (2013.01); *Y02T 10/7061* (2013.01); *Y02T 10/7088* (2013.01); *Y02T 10/7216* (2013.01); *Y02T 10/7241* (2013.01); *Y02T 90/128* (2013.01); *Y02T 90/163* (2013.01)

(58) Field of Classification Search
CPC .................................................. B60L 11/1866

USPC ........ 320/104, 128, 138, 152; 307/43, 48, 65, 307/66, 80
See application file for complete search history.

(56) References Cited

U.S. PATENT DOCUMENTS 8,836,285 B2 * 9/2014 Yamada et al. ................ 320/126
2009/0192655 A1 7/2009 Ichikawa et al.
(Continued)

FOREIGN PATENT DOCUMENTS

EP 2 658 027 A1 9/2012
JP 2007-290845 11/2007
(Continued)

OTHER PUBLICATIONS

Office Action dated Nov. 11, 2014 in corresponding Japanese Application No. 2012-281310.
(Continued)

*Primary Examiner* — Richard V Muralidar
(74) *Attorney, Agent, or Firm* — Harness, Dickey & Pierce, P.L.C.

(57) ABSTRACT

The controller calculates a first limit based on received information about the battery packs and the schedule for charging and discharging plan, and supplies the first limit which serves as a control command to a master battery management unit (BMU), a master BMU receives the first limit. The master BMU sets and distributes the second limit to each one of local battery management function blocks in the battery packs. As a result, each BMU receives the second limit respectively. Then, the each BMU supplies the third limit to a bidirectional power source circuit, respectively, based on failure information FAIL and capacity information SOC of the battery in the battery pack.

10 Claims, 6 Drawing Sheets

(51) Int. Cl.
*H02J 7/04* (2006.01)
*H02J 1/10* (2006.01)
*H02J 3/32* (2006.01)
*H02J 1/00* (2006.01)
*B60L 11/18* (2006.01)
*B60L 3/00* (2006.01)

(56) References Cited

U.S. PATENT DOCUMENTS

2010/0076825 A1 3/2010 Sato et al.
2013/0024035 A1 1/2013 Ito et al.
2014/0028098 A1* 1/2014 Trigiani .......................... 307/39

FOREIGN PATENT DOCUMENTS

| | | |
|---|---|---|
| JP | 2008-054439 | 3/2008 |
| JP | 2008-067481 | 3/2008 |
| JP | 2008-141918 | 6/2008 |
| JP | 2010-081722 | 4/2010 |
| JP | 2013-027214 | 2/2013 |
| WO | 2012/124238 A1 | 9/2012 |

OTHER PUBLICATIONS

U.S. Appl. No. 13/944,045, filed Jul. 17, 2013, Ito.

* cited by examiner

BATTERY SYSTEM

CROSS REFERENCE TO RELATED APPLICATION

This application is based on Japanese Patent Application No. 2012-281310 filed on Dec. 25, 2012, the disclosure of which is incorporated herein by reference.

TECHNICAL FIELD

The present disclosure relates to a battery system which has a plurality of battery packs.

BACKGROUND

JP2008-54439A discloses a power source system which manages power flow between a vehicle and a house by considering power demand in the house.

The power source system has a data retrieval section which retrieves power data relating to the house, day and date, time, and external data such as weather. The power source system has a storage section which stores retrieved data. The power source system has a section which performs classification and self-learning process on the data stored in the storage section.

The power source system has a scheduling section which estimates power demands in the house based on the data classified and self-learned, and plans charging and discharging schedule for a battery on the vehicle based on the estimated power demands in the house. The power source system further has a command section which generates and outputs command signal for charging and discharging the battery based on the planned schedule.

SUMMARY

JP2008-54439A merely considers a single unit of battery on the vehicle, and discloses nothing about control for a plurality of batteries. On the other hand, in recent years, technical development for a power supply system using natural energy is active. In such a system, since power supply from the natural energy is unstable depending upon environment, the system is usually configured with a plurality of batteries.

Like a solar battery panel, the battery is usually packaged with a predetermined capacity unit, such as a 10 kWh. A plurality of batteries are combined to provide huge capacity. For example, 10 packs of batteries of 10 kWh may be combined to provide 100 kWh system. Packaged battery with a predetermined unit, e.g., 10 kWh is advantageous to secure the scalability from a small-size purpose, e.g., for a private house, to a large-size purpose, e.g., for a plant. Specifically, it is possible to use a single pack of 10 kWh in a private home purpose, and to use hundreds of packs of 10 kWh in a factory purpose.

In the power source system having a huge-scale battery system in which a plurality of battery packs are arranged, a controller may be configured to perform energy management in the system. In this system, it is required that the controller can control the battery packs as a single component. It is not desirable that the controller controls the battery packs in a one by one manner.

This requirement is created from a reason for preventing changing of control logic due to a changing of a number of the battery packs, and a reason for reducing communication load. On the other hand, each one of the battery packs needs precise control according to state of the battery pack itself. For example, each one of the battery packs needs control for charging and discharging, control for full charge, and control for preventing over charge and over discharge etc.

The above-mentioned two requirements are contrary to each other. However, it is required to satisfy both requirements.

It is an object of the present disclosure to provide a battery system which has a plurality of battery packs which can be managed as a single component from a controller and can be controlled precisely in a one by one manner.

It is an object of the present disclosure to provide a battery system which is capable of satisfying both requirements, one is to control the battery packs as a single component, and the other one is to provide precise control for each one of the battery packs.

The disclosure of the above-mentioned document may be incorporated by reference into this specification as descriptions for elements.

According to the present disclosure, a battery system is provided. The battery system comprises: a plurality of battery packs; a DC line to which the battery packs are connected; and a controller which sends control commands to the battery packs. Each one of the battery packs includes: a battery; a bidirectional power supply circuit which charges and discharges the battery; and a battery management unit which detects failures of the battery and state of charge of the battery. One battery pack selected from the battery packs has the battery management unit which has a central management function block to perform a master function.

Each one of remaining battery packs, which does not perform the master function, out of the battery packs, has the battery management unit which is configured to receive the control command from the controller through the battery management unit for master function.

The battery management unit for master function is configured to send battery pack information relating to the failure information of the plurality of the battery packs and the state of charge of the battery packs to the controller. The controller is configured to supply information relating to a first limit, which is the control command, to the battery management unit for master function based on the battery pack information received and control plan for the whole system controlled by the controller. The information relating to the first limit includes information for limiting magnitude of charging or discharging of the battery in the battery packs. The battery management unit for master function is configured to receive the information relating to the first limit and to distribute information relating to second limits to each one of local management function blocks in the battery packs based on the first limit.

Each one of the local management function blocks in the battery packs is configured to receive distribution of the information relating to the second limit and to supply information relating to a third limit to the bidirectional power supply circuit in corresponding one of the battery packs based on the failure information or state of charge of the battery of corresponding one of the battery packs.

According to this embodiment, the controller can manage a plurality of battery packs as a single component and the battery packs can be precisely controlled in a one by one manner.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

A plurality of embodiments of the present disclosure are explained referring to drawings. Components and parts corresponding to the components and parts described in the preceding description may be indicated by the same reference number and may not be described redundantly. In a case that only a part of component or part is described, other descriptions for the remaining part of component or part in the other description may be incorporated.

The embodiments may be partially combined or partially exchanged in some forms which are clearly specified in the following description. In addition, it should be understood that, unless trouble arises, the embodiments may be partially combined or partially exchanged each other in some forms which are not clearly specified.

First Embodiment

Figure 1:
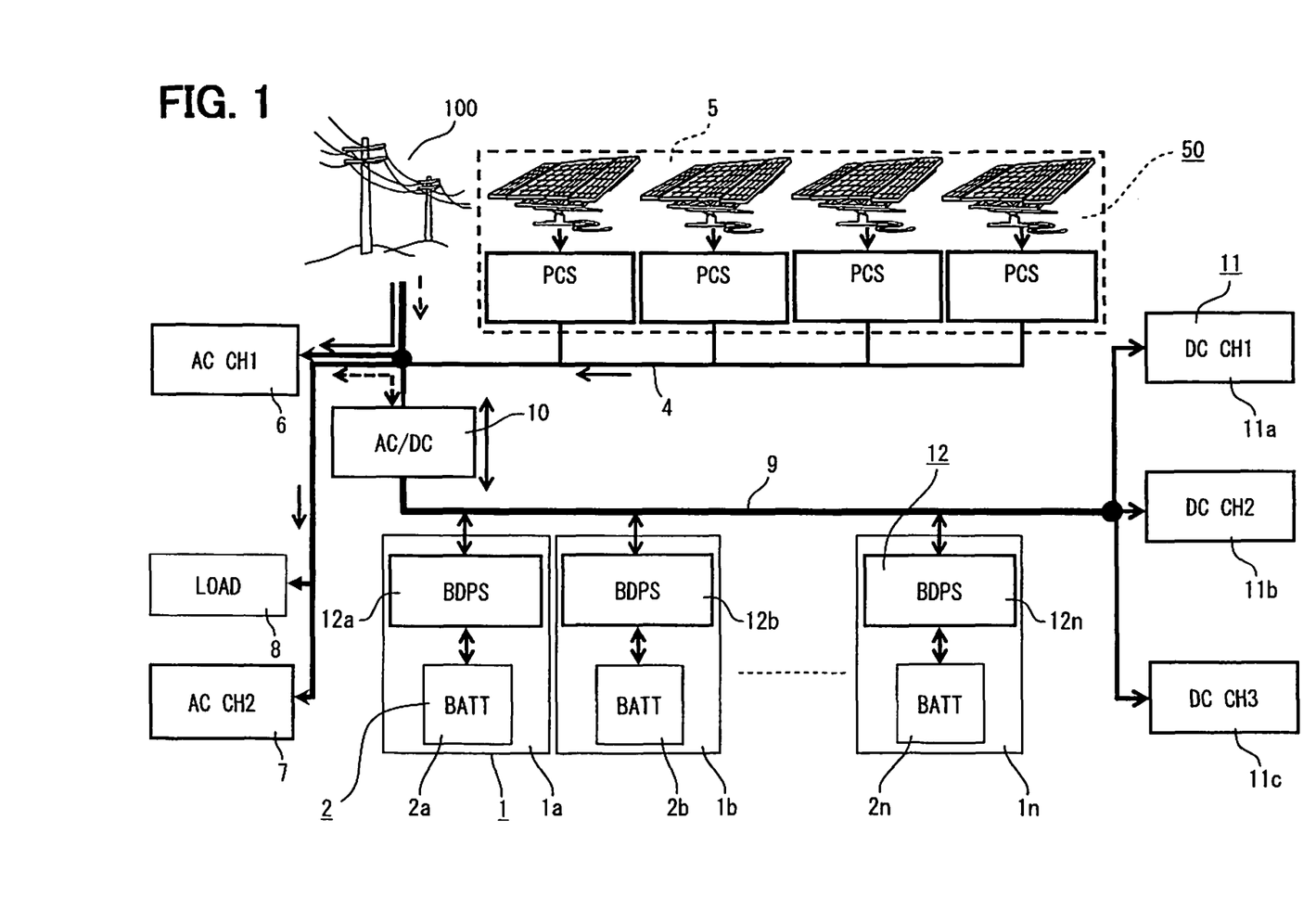
FIG. 1 is a power line diagram showing a battery system having a plurality of batteries according to a first embodiment of the present disclosure.

Hereafter, a first embodiment of the present disclosure is described in detail referencing FIGS. 1-4. FIG. 1 shows a power line system including a battery system which has a plurality of battery packs 1. Each of the battery packs are identified by suffix, such as 1a, 1b, and 1n. For a large consumer, such as a factory or a building, a plurality of battery packs are combined to store electric power. The battery pack 1 has a battery 2 and a bidirectional power supply circuit (BDPS) 12. The battery 2 may be provided by a lithium ion battery or a nickel hydride battery. BDPS 12 has a DC/DC converter which performs charging and discharging for the battery 2. Similarly, each one of the batteries 2 is identified by suffix, such as 2a, 2b and 2n. Each BDPS 12 is identified by suffix, such as 12a, 12b and 12n.

The system is connected with a commercial power 100 via a connection so called 3-phase 3-line type connection. In this embodiment, the commercial power 100 supplies AC power with 60 Hz and rated voltage 200V. The system has an AC line 4 to which the commercial power 100 is connected. The AC line 4 may also be called as a AC bus line 4. The system has an AC-side power source 5, a first AC charger (ACCH1) 6, a second AC charger (ACCH2) 7, and AC loads 8, which are connected to the AC bus line 4. The AC-side power source 5 is provided by a solar power generator device 5. The first and second AC chargers 6 and 7 have capacity of 3 kw respectively. The AC loads 8 may include general appliances such as lighting device etc.

The AC-side power source 5 has one or more power conditioner system (PCS) 50 each of which is coupled with a solar battery. PCS 50 has a DC/AC inverter and a power distribution controller. In this embodiment, the AC-side power source 5 has a plurality of PCS 5, which includes a primary machine and secondary machines. Each normal output of PCS 5 is 10 kw in 3-phase AC.

The system has a DC line 9 with rated voltage 380V. The DC line 9 may also be called as a DC bus line 9. The battery packs 1 are connected to the DC bus line 9. A grid interconnection type AC/DC converter (AC/DC) 10 is provided between the AC bus line 4 and the DC bus line 9. The grid interconnection type AC/DC converter 10 may also be referred to as an AC/DC converter (AC/DC) 10. AC/DC 10 has normal output of 25 kw The system has at least one DC middle speed charger (DCCH) 11 with normal output less than 25 kw. In this embodiment, the system has a plurality of DC middle speed chargers 11. The first to third DC middle speed chargers (DCCH1, DCCH2, DCCH3) 11 are identified by suffix 11a, 11b, and 11c. The DCCH 11 are connected to the DC bus line 9. The DCCH 11 provides DC loads connected to the DC bus line 9.

The first battery pack 1a has the first BDPS 12a. The second battery pack 1b has the second BDPS 12b. The third battery pack 1c has the third BDPS 12n.

Figure 2:
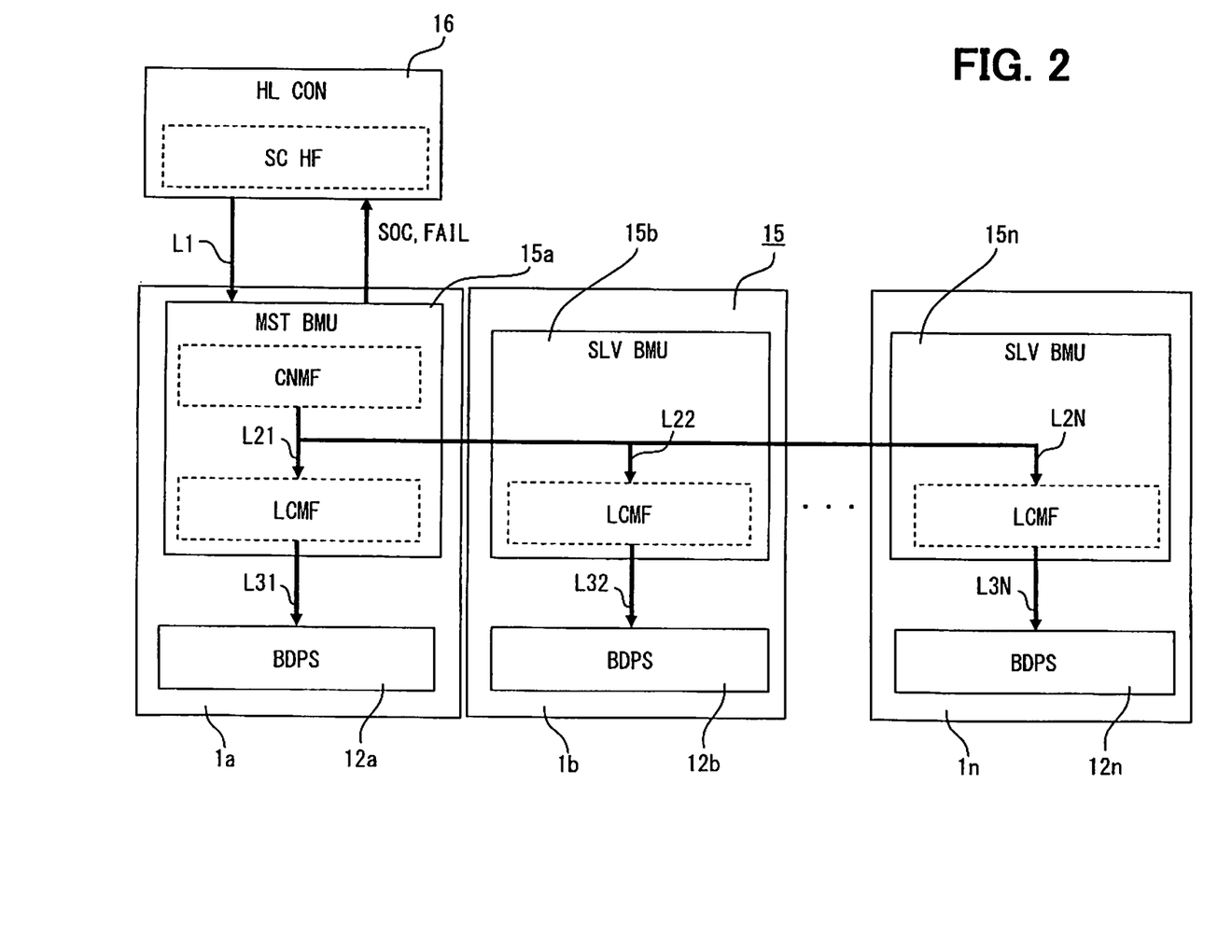
FIG. 2 is a block diagram showing a control system for charging and discharging in the first embodiment.

FIG. 2 is a block diagram showing a control system for a charging and discharging process for batteries. Although it is not illustrated in FIG. 1, bidirectional power supply circuit (BDPS) 12 has a controller which provides a battery management unit (BMU) 15. Each one of the BMU 15 in respective battery pack 1 is identified by suffix, such as 15a, 15b, and 15n.

BMU 15 detects a charged state SOC and information FAIL about failures of the battery 2.

The system has a plurality of BMU 15 including a master BMU (MSTBMU) 15a and slave BMU (SLVBMU) 15b to 15n. MSTBMU 15a has a master function to manage SLVBMU 15b to 15n. MSTBMU 15a is controlled by another controller 16 which may be a higher ranked controller. The controller 16 may also be referred to as a central controller or a central power controller. The controller (HLCON) 16 sends a first limit L1 as a control command to MSTBMU 15a. The first limit L1 is provided to limit an amount of power to be charged and discharged.

BMU 15 is housed within the battery pack 1. HLCON 16 may be provided on an arbitrary location, and is provided as a monitoring control device having a display to display operating condition of the system.

HLCON 16 performs a modeled prediction control which corrects the first limit L1 for every predetermined control cycle, while monitoring information relating to a plurality of battery packs 1 belonging to the system. For example, HLCON 16 monitors charged amount, i.e., remaining amount of electric charge in the batteries 2. The modeled prediction control is disclosed in Patent Application number 2011-161465 in Japan, which is published as JP2013-27214A, US2013/024035A1 or DE102012212878A1, the contents of which are incorporated herein by reference.

According to this configuration, HLCON 16 may just instruct the first limit L1 without monitoring conditions of each one of the battery packs 1 and a total number of the battery packs 1. The first limit L1 can be transformed into values of control commands which are suitable for conditions of the batteries 2 at last. HLCON 16 corrects the first limit L1 for every predetermined control cycle, while monitoring information such as charged amount in all of the batteries 2 in the battery packs 1. Thereby, in view of long term operation, an intention which is programmed and realized by HLCON 16 will be reflected in control of the whole system.

HLCON 16 has a block to perform a scheduling function (SCHF) for charging and discharging operation of the batteries. The scheduling function defines a plan of charging and discharging operation, for example, the plan may be expressed by time and value of charging and discharging current. The first limit L1 corresponds to a command value, i.e., control command, obtained based on the value of the current defined by the plan. Therefore, the first limit L1 is obtained as a value varied according to time. The schedule, i.e., the first limit L1, may be calculated by optimization operation by considering a production of electricity in the system and consumption of electricity in the system.

MSTBMU 15a has blocks to perform both a central management function (CNMF) and a local management function (LCMF). SLVBMU 15b and 15n have a block to perform a local management function (LCMF). Only one battery pack 1a selected among a plurality of battery packs 1 is equipped with the consolidated management function for a plurality of batteries 2 in order to perform a master function.

Each SLVBMU 15b and 15n in the battery packs 1 which does not have a master function among a plurality of battery packs 1 is connected to MSTBMU 15a, and receives control commands from HLCON 16 through MSTBMU 15a.

MSTBMU 15a transmits consolidated battery pack information about battery packs 1 to HLCON 16. The information may include failure information FAIL indicative of failures of the battery pack 1, and capacity information SOC about charged state of the battery pack 1. HLCON 16 calculates information about the first limit L1 based on the received information about the battery packs 1 and the schedule for charging and discharging plan, and supplies the information which serves as a control command to MSTBMU 15a. SOC is the abbreviation for "State Of Charge", and indicates a capacity of battery which is actually usable at this stage. For example, SOC is 100% when the batteries 2 are fully charged, and SOC is 0% when the batteries 2 are fully discharged.

MSTBMU 15a receives information about the first limit L1. MSTBMU 15a distributes information about the second limit L21, L22, L2N to each one of LCMF in the battery pack 1, including LCMF in MSTBMU 15a, based on the first limit L1. In other words, the central management function block in the battery management unit 15a for master function is configured to receive the information relating to the first limit L1. The central management function block in the battery management unit 15a for master function is configured to distribute information relating to second limits L21-L2N to the local management function blocks in the battery packs 1 based on the first limit L1.

As a result, each BMU 15a, 15b, 15n receives the second limit L21, L22, L2N respectively. Then, the each BMU 15a, 15b, 15n supplies information relating to the third limit L31, L32, L3N to the BDPS 12a, 12b, 12n, respectively, based on the failure information FAIL and the capacity information SOC of the battery 2 in the battery pack 1. The first limit L1 is larger than each one of the second limits L21-L2N. Each one of the second limits L21-L2N is equal to or larger than corresponding one of the third limits L31-L3N.

HLCON 16 has a block for performing scheduling function which schedules charging and discharging of the battery pack 1. HLCON 16 plans a schedule for charging and discharging which may minimize power consumption from an external power source such as the commercial power 100. HLCON 16 plans the schedule based on information showing operating conditions of the system. The information may include state of a solar power generator device, which provides the AC-side power source 5, an estimation of power demand on electric loads 6-8, 11a-11c, and the consolidated battery pack information about the battery packs 1 from MSTBMU 15a. HLCON 16 supplies information about the first limit L1 to MSTBMU 15a based on the schedule. The first limit L1 is set in order to restrict an amount of charging and discharging current through the battery 2, i.e., a power of charging and discharging, within a range. The range is set to realize the schedule and keep the battery in an appropriate operational condition.

CNMF in MSTBMU 15a commands LCMF in each one of the battery packs 1 by sending, i.e., distributing the second limits L21, L22, L2N to LCMF, respectively. LCMF in each one of the battery packs 1 receives corresponding one of the second limits L21, L22, L2N. LCMF in each one of the battery packs 1 sets corresponding one of the third limits L31, L32, L3N based on the corresponding one of the second limits L21, L22, L2N and state of the battery 2 in corresponding one of the battery packs 1.

Each controller is an electrical control unit (ECU). The controller has at least one processing unit (CPU) and at least one memory device (MMR) provided as a storage medium which stores a set of program and data. The controller is provided with a microcomputer having the storage medium readable by a computer. The storage medium is a non-transitory storage medium which stores a program readable by the computer. The storage medium can be provided by a device, such as a solid state memory device and a magnetic disc memory. The controller is provided with one computer, or a set of computer resources linked by a data communication device. The program, when executed by the controller, makes the controller to function as devices described in this specification, and makes the controller to perform methods described in this specification. The controller provides a plurality of various elements. At least a part of those elements may be called as means for performing functions, and, in another aspect, at least a part of those elements may be called as structural blocks or modules.

Figure 3:
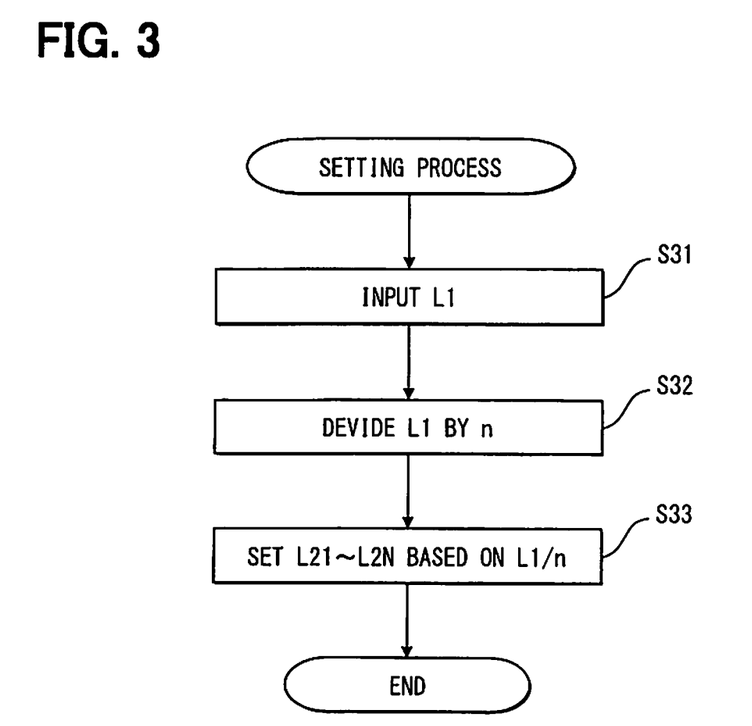
FIG. 3 is a flowchart showing a process for setting a second limit in the first embodiment.

FIG. 3 is a flowchart showing a process for setting a second limit in the first embodiment. The process is performed in the block for CNMF in MSTBMU 15a. The process sets the second limits L21-L2N to share and distribute the first limit L1 by the plurality of battery packs 1. When the process begins, in S31, the block in MSTBMU 15a inputs the first limit L1 from a memory device. MSTBMU 15a has the memory device storing the first limit L1 which is received repeatedly from HLCON 16 and is repeatedly renewed.

In step S32, the value of the first limit L1 is divided equally by a total number "n" of the battery packs 1. In step S33, second limits L21-L2N are set based on the value calculated in step S33. The second limits L21-L2N are set to share the first limit L1 by the battery packs 1. In other words, the first limit L1 is distributed to the second limits L21-L2N. The central management function block in the battery management unit 15a for master function is configured to distributes information relating to the second limits L21-L2N by evenly dividing the first limit L1 by a total number of the battery packs 1. In a case that the system has three battery packs 1, a calculated value obtained by dividing the first limit L1 by the number "3" is assigned to each of the battery packs 1a-1n by setting the calculated value to the second limits L21-L2N respectively. That is, ⅓ of the first limit L1 is distributed to the battery packs 1a-1n by setting the calculated value to the second limits L21-L2N respectively.

Figure 4:
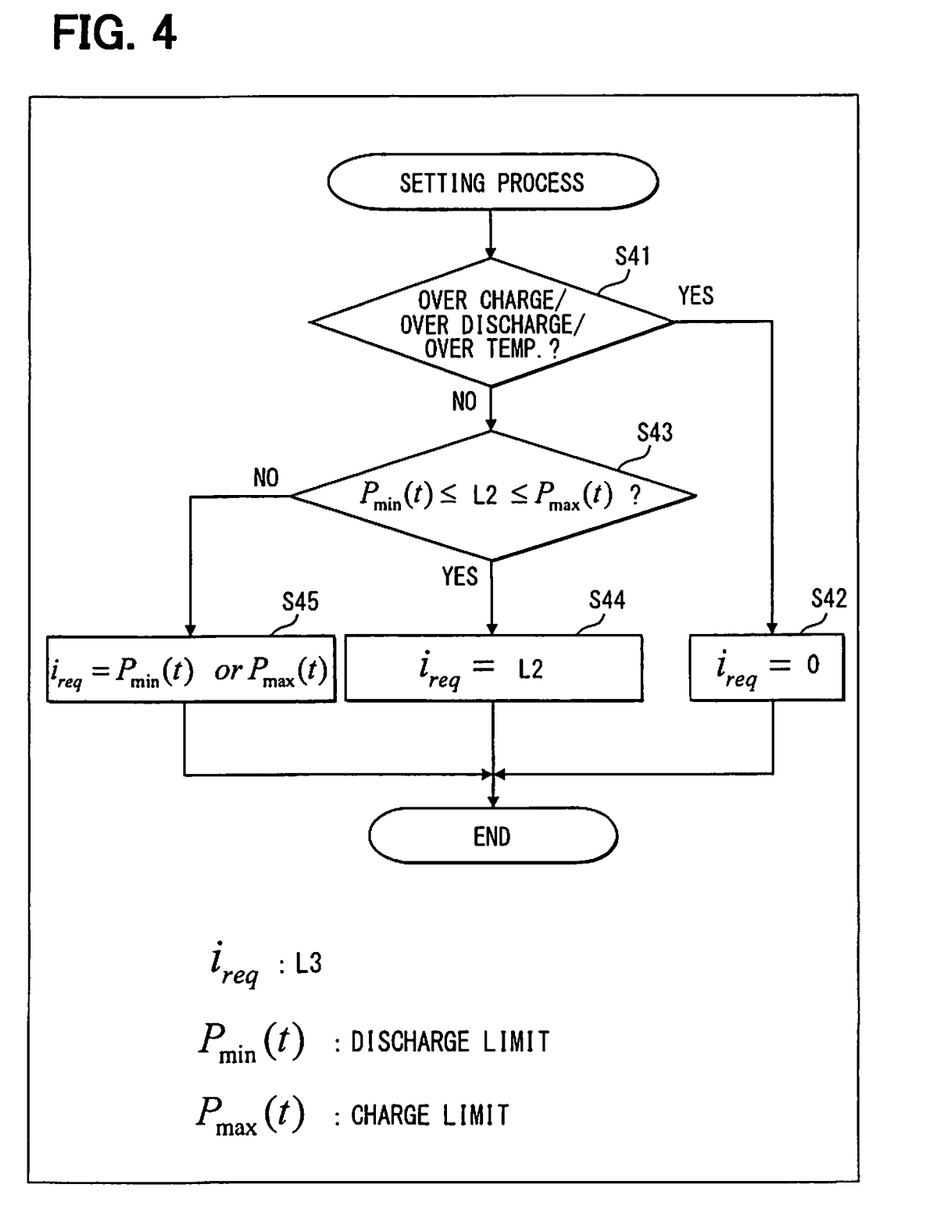
FIG. 4 is a flowchart showing a process for setting a third limit in the first embodiment.

A process for setting third limits L31-L3N based on the second limits L21-L2N is explained. FIG. 4 is a flowchart showing the process. This process can be used in both this embodiment and following embodiment. This process shows process for setting the third limits L31-L3N based on the second limits L21-L2N. The process for setting the third limits is performed in the block for the LCMF disposed in each of the BMU 15*a*, 15*b*, and 15*n* in the battery packs 1.

When the process begins, in S41, the block in the BMU 15 determines that whether the BMU 15 has information indicating one of over charge, over discharge, or over temperature of the battery 2 in the battery pack 1. The over charge, the over discharge, and the over temperature are examples of the information showing failures. The over charge and the over discharge may be determined based on voltages on output terminals of the battery 2, etc.

In a case that the BMU 15 is detecting information showing at least one of the over charge, the over discharge, or the over temperature, the process advances to S42. In S42, the BMU 15 sets 0 (zero) to the third limits L31-L3N, which are shown by a variable "ireq" in FIG. 4, for the battery pack 1 on which at least one of the over charge, the over discharge, or the over temperature happens.

In a case that the BMU 15 is not detecting information showing at least one of the over charge, the over discharge, or the over temperature, the process advances to S43. In S43, the BMU 15 determines that whether the second limits L21-L2N are within a predetermined range or not. The predetermined range is determined by a discharge limit Pmin(t) and a charge limit Pmax(t). The discharge limit Pmin(t) may also be refereed to as a maximum discharge capacity, which takes negative value. The charge limit Pmax(t) may also referred to as a maximum charge capacity, which takes positive value.

The discharge limit Pmin(t) and the charge limit Pmax(t) are set by LCMF in the BMU 15 respectively. The discharge limit Pmin(t) and the charge limit Pmax(t) may be calculated, by using a map, based on a cell temperature and a cell voltage of a battery cell, which is a unit in the battery 2. The map may be previously stored in a memory device in the BMU 15 in a data form. The map may be predetermined based on experimental works. The map shows relationship among the cell temperature, the cell voltage, the discharge limit Pmin(t) and the charge limit Pmax(t).

In a case that the second limit satisfies both the upper and lower limits, the process branches to YES, and advances to S44. In S44, the BMU 15 sets the third limits L31-L3N (ireq) to the same value of the second limits L21-L2N, which are delivered to the battery packs 1.

In a case that the second limit does not satisfy both the upper and lower limits, the process branches to NO, and advances to S45. In S45, the BMU 15 sets the third limits L31-L3N (ireq) to the same value of the discharge limit Pmin (t) or the charge limit Pmax(t). In other words, the third limits L31-L3N (ireq) are clamped by the discharge limit Pmin(t) or the charge limit Pmax(t). As a result, charging and discharging of the battery 2 is controlled at the maximum capacity of the battery 2 by BDPS 12.

According to the embodiment, the battery system comprises the plurality of battery packs 1 (1*a*, 1*b*, 1*n*). Each one of the battery packs includes the battery 2 (2*a*, 2*b*, 2*n*), the bidirectional power supply circuit 12 (12*a*, 12*b*, 12*n*) which charges and discharges the battery 2, and the battery management unit 15 (15*a*, 15*b*, 15*n*) which detects failures of the battery 2 and state of charge of the battery 2. The system comprises the DC line 9 to which the battery packs 1 are connected. The system comprises the DC loads 11 (11*a*, 11*b*, 11*c*) connected to the DC line 9.

One battery pack 1*a* selected from the battery packs 1 has a master function. To perform a master function, MSTBMU 15*a* has the central management function block (CNMF). The system comprises the controller (HLCON) 16 which sends control commands to the battery packs 1. HLCON 16 sends the first limit L1 as a control command to CNMF in MSTBMU 15*a*.

Each one of remaining battery packs 1*b*, 1*n*, which does not perform the master function, out of the battery packs 1 has the battery management unit (SLVBMU) 15*b*, 15*n* which is connected to MSTBMU 15*a* and configured to receive the control command from HLCON 16 through MSTBMU 15*a*. The battery management unit 15*a* for master function is configured to send battery pack information relating to the failure information of the plurality of the battery packs 1 and the state of charge of the battery packs 1 to the controller 16.

HLCON 16 calculates information about the first limit L1 based on the received information about the battery packs 1 and the schedule for charging and discharging plan, and supplies the information which serves as a control command to MSTBMU 15*a*.

MSTBMU 15*a* receives information about the first limit L1. MSTBMU 15*a* distributes and supply information about the second limit L21, L22, L2N to each one of LCMF in the battery pack 1, including LCMF in MSTBMU 15*a*, based on the first limit L1.

Each one of the local management function blocks in the battery packs 1 is configured to receive distribution of the information relating to the second limit L21-L2N. Each one of the local management function blocks in the battery packs 1 is configured to supply information relating to a third limit L31-L3N to the bidirectional power supply circuit 12 in corresponding one of the battery packs 1 based on the failure information or state of charge of the battery 2 of corresponding one of the battery packs 1.

Each of SLVBMU 15*b* and 15*n* in the battery packs 1 which does not have a master function among a plurality of battery packs 1 is connected to MSTBMU 15*a*, and receives control commands from HLCON 16 through MSTBMU 15*a*. Compared with a case where HLCON 16 directly controls the charge state and discharge state of each battery pack 1, it is possible to perform control which matches state of the battery 2. In other words, it is possible to control each battery pack 1 by supplying the third limit L31-L3N, which is a final control command, to BDPS 12 while considering state of the battery 2 in each battery pack 1 and the first limit L1, which is a control command from HLCON 16.

Therefore, the controller can manage a plurality of battery packs as a single component and the battery packs can be precisely controlled in a one by one manner.

The first limit L1 is larger than each one of the second limits L21-L2N. Each one of the second limits L21-L2N is equal to or larger than corresponding one of the third limits L31-L3N.

It is possible to perform precise control for each one of the battery packs 1 by setting the third limit L31-L3N in small values even if the first limit L1 and the second limits L21-L2N are in large values.

The system has the AC line 4 which is connected to the DC line 9 via the AC/DC converter 10 and is connected to the commercial power 100. It is possible to charge each battery 2 by the commercial power 100 via the AC/DC 10. It is possible to supply power from the commercial power 100 to the DC loads 11*a*-11*c* connected to the DC line 9.

The controller 16 has a scheduling function block which plans a charging and discharging schedule. The controller 16 estimates state of power generation on the AC-side power source 5. The controller 16 estimates power demand on electric loads 6-7, 11*a*-11*c*. The controller 16 receives the battery pack information which is consolidated information relating to state of charge and failures of the batteries 2 in the battery packs 1 from MSTBMU 15*a*. The controller 16 plans, based on the information received and estimated, the charging and discharging schedule which minimizes power consumption from a commercial power 100. The charging and discharging schedule is planned to minimize power consumption from a commercial power 100 based on information showing an estimation of power demand on electric loads (6-7, 11) at least including a DC load (11) on the DC line (9), and the battery pack information relating to a state of charge of the battery packs 1 from the battery management unit (15a) for master function.

The controller 16 sets the first limit L1 based on the schedule planned and supplies the first limit L1 to the battery management unit 15a for master function. It is possible to realize the charging and discharging schedule which minimizes power consumption from a commercial power 100.

LCMF in each BMU 15 can modify corresponding one of the second limit L21-L2N, which is transmitted as a command from CNMF in MSTBMU 15a, based on state of the battery 2 in each battery pack 1. The third limits L31-L3N are the results of the modification.

LCMF in each BMU 15 can modify corresponding one of the second limit L21-L2N based on state of the battery 2 in each battery pack 1. Therefore, it is possible to modify corresponding one of the second limits L21-L2N to an appropriate value, the third limit, before the system gets serious failures, based on the state of the battery 2, such as an over charge or the over discharge. It is possible to protect the battery 2.

Since the first limit L1 is set based on estimation result, such as power generation amount estimated by HLCON 16, the first limit L1 is less reliable. However, it is possible to modify the first limit L1 into value, i.e., the third limit, which reflects state of each battery 2. HLCON 16 may just instruct the first limit L1 without monitoring conditions of each one of the battery packs 1 and a total number of the battery packs 1. The first limit L1 can be transformed into values of control commands, the third limits L31-L3N, which are suitable for conditions of the batteries 2 at last.

The third limit is set by LCMF in corresponding BMU 15, which can detect and recognize detailed information about the battery 2. Therefore, it is possible to set the third limit L31-L3N in accordance with condition of the battery 2 without sending out the information about the battery 2 such as information about cell. As a result, it is possible to reduce communication loads.

In the first embodiment, the central management function block in the battery management unit 15a for master function is configured to distribute information relating to the second limits L21-L2N by evenly dividing the first limit L1 by a total number of the battery packs 1.

As a result, the battery management unit in MSTBMU 15a can easily divide the first limit L1 into the second limits L21-L2N and distribute them to corresponding LCMF in each battery pack 1.

Since the second limits L21-L2N are set by dividing the first limit L1 by the number of battery packs 1, total amount of the second limits L21-L2N never exceeds the first limit L1. Therefore, it is possible to reflect intention of the HLCON 16 to charge and discharge control for the plurality of batteries 2.

The block for CNMF in MSTBMU 15a retrieves the first limit L1, which is set to limit current value or power value in charging and discharging phases, from HLCOM 16. The block for LCMF in each BMU 15 sets the discharge limit Pmin(t) and the charge limit Pmax(t) of the battery 2 based on temperature of the cell of the battery and voltage of the cell by using a map.

Each BMU 15 has a memory device which stores the map. The map shows relationship among the cell temperature, the cell voltage, the discharge limit Pmin(t) and the charge limit Pmax(t). The map may be predetermined based on experimental works. When the second limit L21-L2N is within the range between the discharge limit and the charge limit, LCMF distributes the second limit L21-L2N as the third limit L31-L3N.

The local management function block in the battery management unit 15 in the battery pack 1 modifies the second limit L21-L2N from the central management function block in order to set the third limit L31-L3N. The second limit L21-L2N is modified based on at least one of an over charge, an over discharge and an over temperature, or combination of them, which shows state of the battery 2 in the battery pack 1. The local management function block in the battery management unit 15 is configured to adjust corresponding third limit L31-L3N.

The local management function block adjusts the third limit L31-L3N to 0 (zero) regardless of the second limit L21-L2N in response to detecting of at least one of an over charge, an over discharge and an over temperature in the battery 2 in the battery pack 1. Alternatively, the local management function block may adjust the third limit L31-L3N to a reduced value regardless of the second limit L21-L3N in response to detecting of at least one of an over charge, an over discharge and an over temperature in the battery 2 in the battery pack 1. It is possible to control the battery in a safe side even in an abnormal condition, such as an over charge, an over discharge or an over temperature.

The local management function block uses the second limit L21-L2N as the third limit L31-L3N, ireq when the second limit L21-L2N is within the range between the discharge limit and the charge limit. The local management function block adjusts the third limit L31-L3N to the charge limit or the discharge limit regardless of the second limit L21-L3N when the second limit L21-L3N is not within the range between the discharge limit and the charge limit.

In other words, the local management function block in the battery management unit 15 is configured to calculate a charge limit and a discharge limit based on temperature and voltage in the battery 2. The local management function block in the battery management unit 15 is configured to supply the third limit L31-L3N to BDPS 12. The local management function block in the battery management unit 15 is configured to supply the third limit L31-L3N which is adjusted within a range between the discharge limit to the charge limit. In control for charging and discharging the battery 2, it is possible to consider state of the battery 2 monitored by the local management function block in order provide appropriate control.

The third limit is set by the local management function block in the battery pack 1. Therefore, it is possible to set the third limit L31-L3N in accordance with condition of the battery 2. In addition, it is not necessary to send local information, such as temperature of a cell, to the other function blocks, therefore, it is possible to reduce communication loads.

Second Embodiment

In subsequent embodiments, different configurations and features from the previous embodiment are mainly explained, and the same or corresponding components in the previous embodiment may be indicated by using the same reference numbers or symbols in order to avoid redundancies. In the first and second embodiments, the same components are indicated by the same reference numbers or symbols. For such components, previous descriptions can be incorporated.

Figure 5:
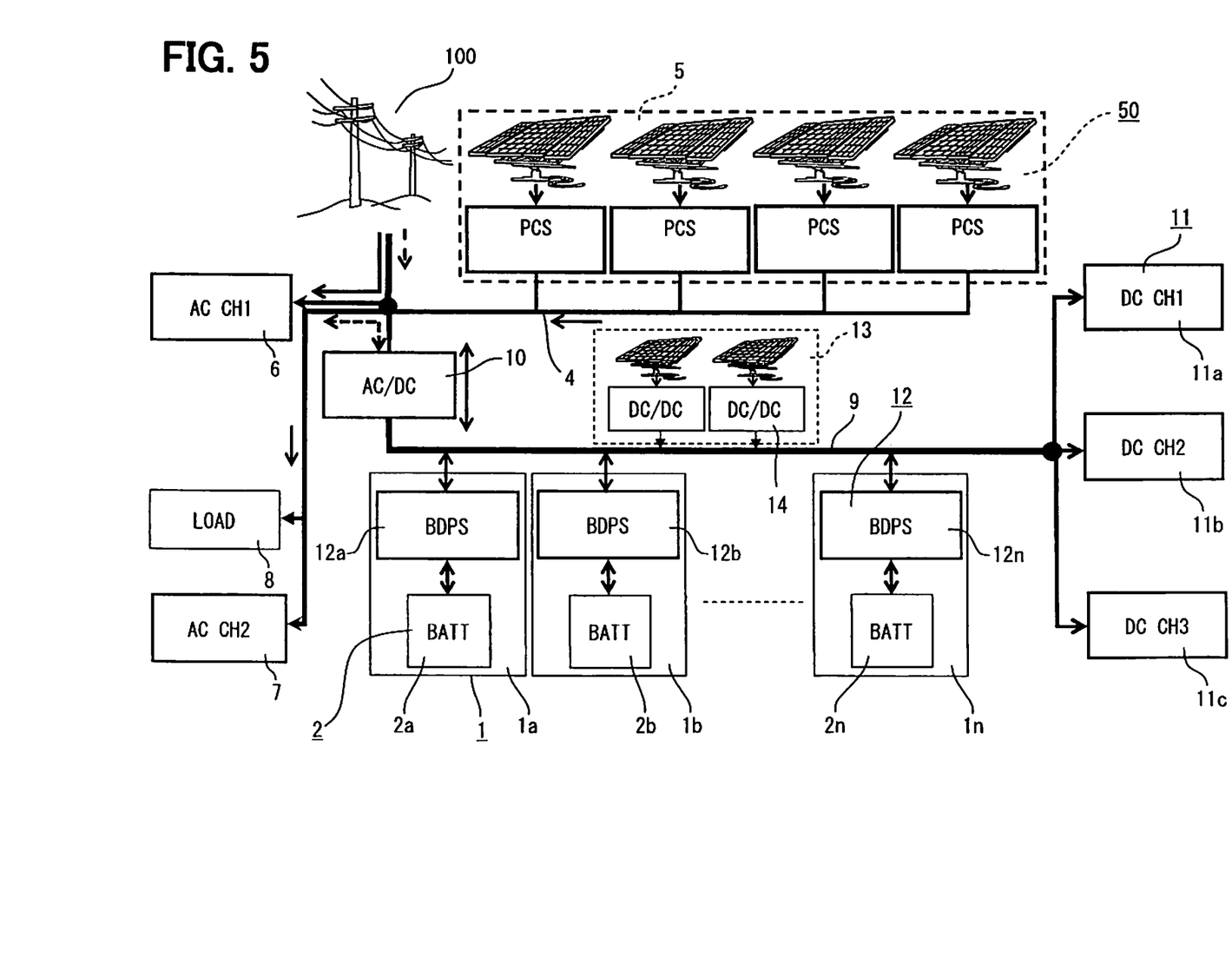
FIG. 5 is a power line diagram showing a battery system according to a second embodiment of the present disclosure.

FIG. 5 is a power line diagram showing a battery system according to a second embodiment. The battery system further has a DC-side power source 13. The DC-side power source 13 is connected to the DC line 9. The DC-side power source 13 has a plurality of solar power generator devices. Each of the solar power generator devices is connected to the DC line 9 via a DC/DC converter (DC/DC) 14. According to the embodiment, it is possible to charge the battery 2 in each one of the battery packs 1 by the DC-side power source 13 through the DC line 9. In addition, or alternatively, it is possible to supply power to the DC loads 11a-11c connected to the DC line 9 from the DC-side power source 13.

Control system for charging and discharging the battery in the second embodiment may be explained by FIG. 2. In the second embodiment, CNMF in MSTBMU 15a also sets and distributes the second limits L21-L2N to the battery packs 1. In the second embodiment, CNMF performs the setting and distributing function based on state of charge and discharge of corresponding one of the battery packs 1. In detail, CNMF performs the setting and distributing function based on SOC of corresponding one of the battery packs 1. Since distributing the first limit L1 to the battery packs 1 is performed by considering conditions of the battery packs 1, it is possible to avoid or reduce over load or over work of each of the battery packs 1.

Figure 6:
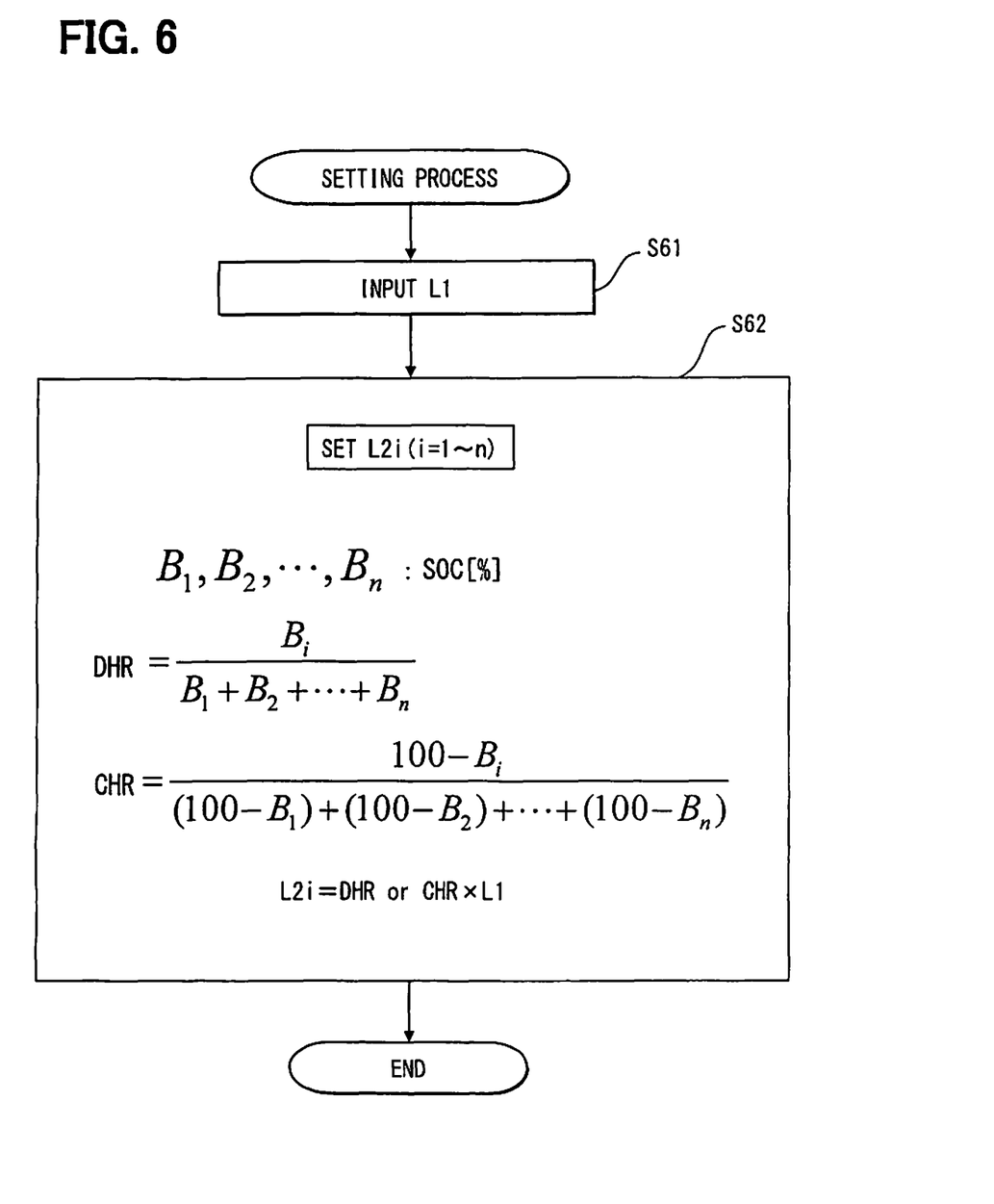
FIG. 6 is a flowchart showing a process for setting a second limit in the second embodiment.

FIG. 6 shows a process for setting the second limits L21-L2N.

When the process begins, in S61, the block in MSTBMU 15a inputs the first limit L1 from a memory device. MSTBMU 15a has the memory device storing the first limit L1 which is received repeatedly from HLCON 16 and is repeatedly renewed. In S62, MSTBMU 15a sets the second limits L2i (i=1 to N) to share the first limit L1 by the battery packs 1 in accordance with performance ratios of corresponding one of the batteries 2. The performance ratio of the battery 2 shows a ratio of a performance of one battery 2 within a total performance of the batteries 2 in the system.

In detail, the battery 2 may perform differently in discharging and charging period. Therefore, in this embodiment, different ratios are used in a discharging phase and in a charging phase. When the system demands the battery 2 to be discharged, in a discharging phase, the performance of the battery 2 may be indicated by a discharging SOC ratio DHR. DHR shows a ratio of dischargeable power of one battery 2 per total dischargeable power of the batteries 2. DHR takes value from 0 to 1.0. When the system demands the battery 2 to be charged, in a charging phase, the performance of the battery 2 may be indicated by a charging SOC ratio CHR. CHR shows a ratio of chargeable power of one battery 2 per total chargeable power of the batteries 2. CHR takes value from 0 to 1.0. Therefore, in this embodiment, the first limit L1 is distributed based on the performance ratios of the batteries 2, e.g., DHR and/or CHR. DHR and CHR are calculated for each one of the battery packs 1. There will be DHRi (i=0 to N) and DHRi (i=0 to N).

In the discharging phase, MSTBMU 15a divides the first limit L1 into the second limits L2i (i=1 to N) based on the values Bi (i=1 to N). The first limit L1 is divided based on DHR. Then, MSTBMU 15a assigns the second limit L2i to corresponding one of the battery packs 1. The second limit L2i is set so that the more the value Bi becomes, the more power the battery 2 is discharged. As a result, one battery 2 discharges more power as the value Bi becomes larger and takes greater parts of the total SOC.

In a case that the system has "N" of the battery packs 1, each battery packs 1 has SOC value B1, B2, BN. The ratio DHRi can be calculated by dividing Bi by a total SOC, i.e., DHRi=Bi/(B1+B2+ . . . +BN). The second limit L2i can be calculated by applying DHRi to the first limit L1. As a result, the first limit L1 can be divided according to a ratio of dischargeable capacities. In other words, one battery pack 1 is assigned with the second limit L2i of which value becomes larger as the battery 2 is charged more amount of power, i.e., has larger value Bi of SOC. As a result, one battery pack 1 is allowed to discharge large power as it has larger value Bi of SOC. Alternatively, the voltage on the output terminals of the battery 2 may be used instead of SOC.

In the charging phase, MSTBMU 15a divides the first limit L1 into the second limits L2i (i=1 to N) based on the values Bi (i=1 to N). The first limit L1 is divided based on CHR. Then, MSTBMU 15a assigns the second limit L2i to corresponding one of the battery packs 1. The second limit L2i is set so that the less the value Bi becomes, the more power the battery 2 is charged. As a result, one battery 2 is charged more power as the value Bi becomes smaller and takes less parts of the total SOC.

The ratio CHRi can be calculated by dividing 100−Bi by a total of chargeable capacity, i.e., CHRi=(100−Bi)/((100−B1)+(100−B2)+ . . . +(100−BN)). The second limit L2i can be calculated by applying CHRi to the first limit L1. As a result, the first limit L1 can be divided according to a ratio of chargeable capacities. In other words, one battery pack 1 is assigned with the second limit L2i of which value becomes larger as the battery 2 is charged less amount of power, i.e., has smaller value Bi of SOC. As a result, one battery pack 1 is allowed to be charged large power as it has smaller value Bi of SOC.

In this embodiment, the system has the DC-side power source 13 which is connected to the DC line 9. It is possible to charge the battery 2 from the DC-side power source 13 via the DC line 9. It is possible to supply power from the DC-side power source 13 to the DC loads 11a-11c via the DC line 9.

The central management function block in the battery management unit 15a for master function is configured to distribute information relating to the second limits L21-L2N according to values of state of charge of the battery packs 1. MSTBMU 15a is configured to distribute information relating to the second limits L21-L2N according to values of state of charge and discharge of the battery packs 1. According to this, since distribution of the second limits L21-L2N is performed in consideration of the charge and discharge state of each battery pack 1, it is possible to improve possibilities to implement charge and discharge which follows the scheduling of the controller precisely, and is possible to perform efficient charge and discharge.

In this embodiment, the first to third limits are set to satisfy the following relationship, L1>L21-L2N>=L31-L3N.

The controller 16 commands the first limit L1 to the battery packs 1. In the battery packs 1, the central management function block monitors a charge and discharge capability of the battery 2 and a charged amount, e.g., SOC, in the battery 2. The central management function block distributes the first limit L1 into the second limits L21-L2N. The local management function block modifies the second limit into the third limit L31-L3N based on state of the battery 2.

Since the first limit L1 is set based on estimation result, such as power generation amount estimated by the controller 16, the first limit L1 is less reliable. However, it is possible to modify the first limit L1 into value, i.e., the third limit, which reflects state of each battery 2. According to this configuration, the controller 16 may just instruct the first limit L1 without monitoring conditions of each one of the battery packs 1 and a total number of the battery packs. The first limit L1 can be transformed into values of control commands, the third limits L31-L3N, which are suitable for conditions of the batteries 2 at last.

On the contrary, there may be concerns that a charging current or a discharging current could not be limited in levels that is scheduled by the controller 16. The charging current and the discharging current may be replaced with a charging power and a discharging power. However, this problem can be solved by performing a modeled prediction control while monitoring SOC of whole batteries 2 etc. For example, as disclosed in Patent Application number 2011-161465 in Japan, the controller 16 may correct the first limit L1, i.e., the scheduling, for every control cycle. Therefore, in view of a long term, it is possible to reflect the intention of the controller 16 on charging current control or discharge current control.

Calculating process to the third limits L31-L3N in this embodiment is the same as described in FIG. 6. Therefore, in this embodiment, modification of limit values in the local management function block in each BMU 15 is performed as follows. As shown in FIG. 6, MSTBMU 15a calculates the second limits L21-L2N, which matches information about remaining capacity of the battery pack 1, by modifying the first limit L1 based on the information about remaining capacity of the battery 2 in each one of the battery packs 1. The information about remaining capacity of the battery 2 in each one of the battery packs 1 may be presented by SOC, and may be replaced by the voltage on the terminals of the battery.

Then, similar to the description in FIG. 4, such as S43, each BMU 15 detects an over charge, an over discharge or an over temperature, and sets the third limit L31-L3N or ireq to 0 (zero) in order to restrict a charge current or a discharge current before the system reaches to a serious failure. The charge current or the discharge current may be replaced by a charge power or a discharge power. Each BMU 15 may sets the third limit L31-L3N or ireq to a reduced value which may avoid the system from a serious failure. That is, each BMU 15 sets the third limit L31-L3N (ireq) to control the charge current or discharge current to 0 (zero) when abnormality such as an over temperature of a cell of the battery 2 is detected.

As shown in S42, each BMU 15 sets the third limits L31-L3N (ireq) to 0 (zero) regardless the second limit L21-L2N before the system gets a serious failure which may be caused by the over charge or the over discharge. As shown in S42, each BMU 15 also sets the third limits L31-L3N (ireq) to 0 (zero) regardless the second limit L21-L2N before the system gets a serious failure which may be coursed caused by an excessive increase of temperature of the cell in the battery 2.

In a case of no information about failures such as an over charge, an over discharge or an over temperature, each BMU 15 sets the third limits L31-L3N (ireq) in the following ways. In S44, each BMU sets the third limits L31-L3N (ireq) to corresponding values of the second limits L21-L2N, which are within a range between the charge limit and the discharge limit. The charge limit may also be referred to as a maximum charge current. The discharge limit may also be referred to as a maximum discharge current. In S45, each BMU sets the third limits L31-L3N (ireq) to corresponding values of the charge limit or the discharge limit.

Therefore, each BMU 15 performs anti-failure measures while setting the third limit as large as possible based on information about remaining charged capacity of the battery 2 in each battery pack 1. The anti-failure measures include at least one of measure against over load such as an over charge and an over discharge and measure against over temperatures such as an over temperature of a cell temperature of the battery 2 in each battery pack 1. Since anti-failure measures can be taken by each battery pack 1, it is possible to reduce communication loads in comparison with a system that detects failures and takes anti-failure measures in a remote control manner.

Other Embodiments

The preferred embodiments of the present disclosure have been described. However, the present disclosure is not limited to the above embodiments, and the above embodiments may be modified in various ways without departing from the spirit and scope of the disclosure. The configuration of the above described embodiments is just examples. The disclosure in its broader terms is therefore not limited to the specific details, representative apparatus, and illustrative examples shown and described. The extent of the present disclosure is shown by the scope of the claims, and also includes the changes, which is equal to and within the same range of the scope of the claim.

In the above mentioned embodiments, the battery packs are fixed type. However, at least one or all of the battery packs may be provided by a movable battery, such as a battery mounted on a vehicle. For example, the system provides the battery packs by connecting the batteries on vehicles. In this case, number of batteries may be variable by changing number of vehicles. Each vehicle has a BMU which works as SLVBMU or MSTBMU. The first, second and third limit may be provided as a current value or a power value to limit.

In the above mentioned embodiments, the third limit is set to 0 (zero) in response to abnormal event, such as an over charge, an over discharge, and an over temperature. Alternatively, the third limit may be set to a reduced value which allows recovery measure from the abnormal event.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, are preferred, other combinations and configurations, including more, less or only a single element, are also within the spirit and scope of the present disclosure.

What is claimed is:

1. A battery system comprising: a plurality of battery packs; a DC line to which the battery packs are connected; and a controller which sends control commands to the battery packs, wherein each one of the battery packs includes: a battery; a bidirectional power supply circuit which charges and discharges the battery; and a battery management unit which detects failure causing information of the battery, including an over charge, an over discharge or an over temperature, before the system reaches a serious failure and state of charge of the battery, and wherein one battery pack selected from the battery packs has the battery management unit which has a central management function block to perform a master function, and wherein each one of remaining battery packs, which does not perform the master function, out of the battery packs has the battery management unit which is configured to receive the control command from the controller through the battery management unit for master function, and wherein the battery management unit for master function is configured to send battery pack information relating to the failure causing information of the plurality of the battery packs and the state of charge of the battery packs to the controller, and wherein the controller is configured to supply information relating to a first limit, which is the control command, to the battery management unit for master function based on the battery pack information received and control plan for the whole system controlled by the controller, and wherein the information relating to the first limit includes information for limiting magnitude of charging or discharging of the battery in the battery packs, and wherein the battery management unit for master function is configured to receive the information relating to the first limit and to distribute information relating to second limits to each one of local management function blocks in the battery packs based on the first limit, and wherein each one of the local management function blocks in the battery packs is configured to receive distribution of the information relating to the second limit and to supply information relating to a third limit to the bidirectional power supply circuit in corresponding one of the battery packs based on the failure causing information or state of charge of the battery of corresponding one of the battery packs.

2. The battery system in claim 1, wherein
the first limit is larger than each one of the second limits, and each one of the second limits is equal to or larger than corresponding one of the third limits.

3. The battery system in claim 1, wherein
the central management function block in the battery management unit for master function is configured to distribute information relating to the second limits by evenly dividing the first limit by a total number of the battery packs.

4. The battery system in claim 1, wherein
the central management function block in the battery management unit for master function is configured to distribute information relating to the second limits according to values of state of charge of the battery packs.

5. The battery system in claim 1, wherein
the local management function block in the battery management unit is configured to supply the third limit based on the failure causing information of the battery of corresponding one of the battery packs.

6. The battery system in claim 1, wherein
the local management function block in the battery management unit is configured to calculate a charge limit and a discharge limit based on temperature and voltage in the battery, and wherein
the local management function block in the battery management unit is configured to supply the third limit which is adjusted within a range between the discharge limit and the charge limit.

7. The battery system in claim 6, wherein
the local management function block in the battery management unit is configured to adjust the third limit, wherein
the local management function block adjusts the third limit to 0 (zero) or a reduced value regardless of the second limit in response to detecting of at least one of an over charge, an over discharge and an over temperature in the battery in the battery pack, and wherein
the local management function block adjusts the third limit to the charge limit or the discharge limit regardless of the second limit when the second limit is not within the range between the discharge limit and the charge limit.

8. The battery system in claim 1, wherein
the controller has a scheduling function block which plans a charging and discharging schedule which minimizes power consumption from a commercial power based on information showing an estimation of power demand on loads at least including a DC load on the DC line, and the battery pack information relating to a state of charge of the battery packs 1 from the battery management unit for master function, and wherein
the controller sets the first limit based on the schedule planned and supplies the first limit to the battery management unit for master function.

9. The battery system in claim 8, further comprising
an AC line which is connected to the DC line via an AC/DC converter and is connected to the commercial power.

10. The battery system in claim 1, further comprising
a DC-side power source which is connected to the DC line.

\* \* \* \* \*